S. L. ALLEN.
CULTIVATOR AND CULTIVATOR TEETH.
APPLICATION FILED OCT. 28, 1908.
965,848.
Patented Aug. 2, 1910.
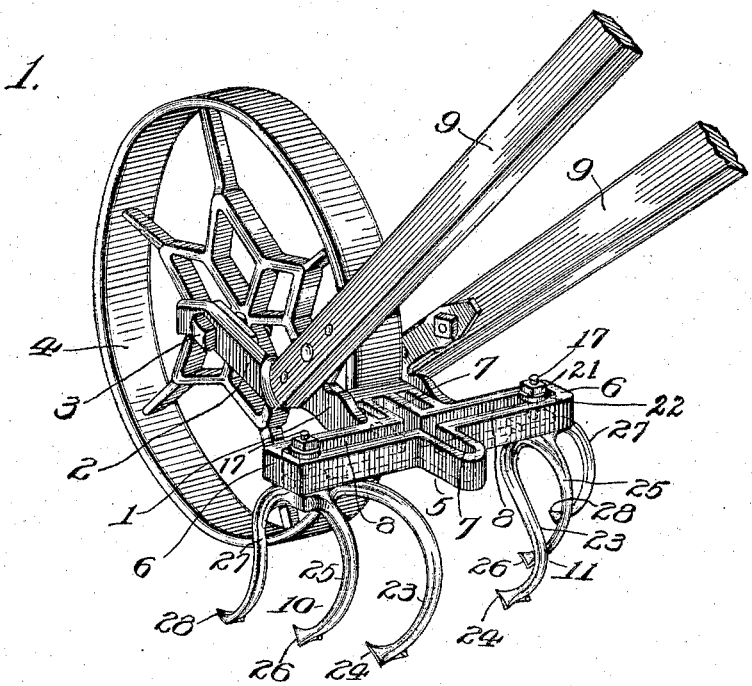
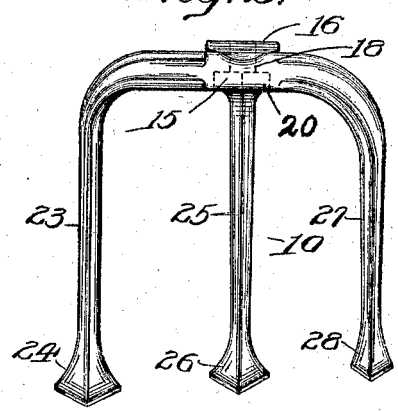
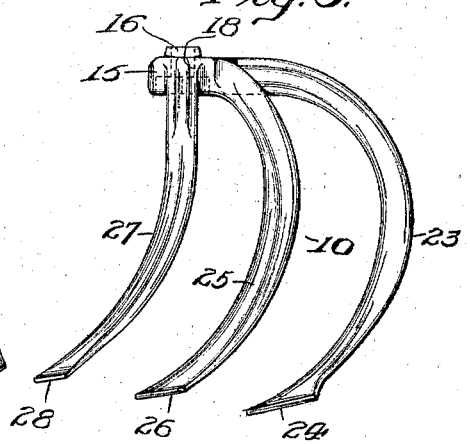
WITNESSES
INVENTOR
Samuel L. Allen.
BY
ATTORNEY

UNITED STATES PATENT OFFICE.

SAMUEL L. ALLEN, OF MOORESTOWN, NEW JERSEY.

CULTIVATOR AND CULTIVATOR-TEETH.

965,848.  Specification of Letters Patent.  Patented Aug. 2, 1910.

Application filed October 28, 1908. Serial No. 459,838.

*To all whom it may concern:*

Be it known that I, SAMUEL L. ALLEN, a citizen of the United States, and a resident of Moorestown, county of Burlington, State of New Jersey, have invented certain new and useful Improvements in Cultivators and Cultivator-Teeth, of which the following is a full, clear, and exact description, reference being had to the accompanying drawings, forming a part of this specification.

The main objects of this invention are to provide an improved cultivator; and an improved cultivator tooth or tool having a plurality of prongs or cutting points.

In the accompanying drawings, Figure 1 is a perspective view of a cultivator constructed in accordance with this invention; Fig. 2 a front elevation of one of the improved cultivator teeth forming part of this invention; and Fig. 3 a side elevation of the tooth.

This invention is shown as applied in a single wheel cultivator of a well known type comprising a frame 1 having a forwardly extending arm 2 rigid therewith, to which is secured the axle 3 upon which is rotatably mounted the carrier wheel 4. Projecting in the rear of the carrier wheel and forming part of the frame of the cultivator is the substantially horizontal bracket 5 having oppositely disposed lateral projections 6 integral therewith, and having a central, oblong longitudinal slot 7 intersected by a transverse oblong slot 8 extending through the lateral projections for adjustably holding cultivator teeth or other tools. The cultivator is provided with the usual handle bars 9 rigidly secured to the frame of the machine.

A pair of improved three pronged cultivator teeth or tools 10 and 11 are adjustably secured upon opposite sides of the cultivator respectively in the transverse slot 8 of the bracket 5. These tools are of similar construction but adapted to be placed upon opposite sides respectively of the cultivator and to work upon opposite sides respectively of the row or rows of plants to be cultivated. Each of said tools comprises a head 15 having a reduced upward extension or lug 16 substantially rectangular and oblong in cross section adapted to fit snugly in the transverse oblong slot 8 of the cultivator to prevent the head from rotating. This reduced upward extension of the head is less in height than the depth of the slot in the bracket in which it fits and the head is held adjustably in fixed position upon the under side of the bracket by means of a bolt 17 which passes through a vertical aperture 18 provided therefor in the head. The head of the bolt 17 fits snugly in a rectangular recess 20 provided therefor in the under side of the head and the upper end of the bolt is threaded and provided with a nut 21 and a washer 22 between the nut and the bracket to clamp the head of the tool rigidly in place.

Diverging from the head 15 of each tool and integral therewith are three prongs, the inner one 23 of which curves inwardly and rearwardly, then downwardly and rearwardly and then downwardly and forwardly terminating in a broadened extremity forming a tooth 24; the central prong 25 curves downwardly and rearwardly and then downwardly and forwardly and terminates in a tooth 26, less broad than the tooth 24 of the inner prong, and slightly above and in front of the latter tooth; and the outer prong 27 extends outwardly and then curves downwardly and forwardly and terminates in a tooth 28 less broad than the tooth 26 of the central prong and slightly above and in front of the latter tooth.

The longitudinal axes of the downwardly extending portions of the several prongs and of the several teeth of each tool lie mainly in planes parallel to the central longitudinal vertical plane of the machine. The several teeth of each three pronged tooth or tool are substantially equal in rake and clearance, but diminish consecutively, as described, in size and in depth, the points of the three teeth being arranged in a substantially straight line oblique to the ground plane and oblique to the central vertical plane of the machine. Any number of prongs and teeth may be used upon each tool following the arrangement described, but three teeth are considered sufficient for most purposes.

In the machine illustrated, a right hand tool is shown upon one side of the machine and a left hand tool upon the other side and the teeth are in lines diverging forwardly, the teeth decreasing in size and depth outwardly from the center of the machine and the carrier wheel is in the central plane of the machine. This arrangement is intended to be used to cultivate simultaneously the adjacent sides of two adjacent rows of plants, penetrating the soil only slightly close to each row with the smallest teeth to avoid disturbing the roots of the plants, but increasing the depth of penetration consecutively with the larger teeth toward the center of the space between the rows.

If the rows are too wide apart to be worked by the arrangement of the tools as illustrated, the tools may be interchanged to reverse the arrangement and to bring the teeth into lines converging forwardly, the smallest teeth being nearest the center of the machine. In this case the carrier wheel 4 is attached to the left hand side of its supporting arm 2 to permit the tools to straddle a row of plants to cultivate both sides of the row at once, the results being the same as heretofore described.

Having thus described my invention, I claim and desire to protect by Letters Patent of the United States:—

1. In a cultivator the combination of a carrier wheel, a frame supported thereon and provided with a laterally extending projection, and a cultivator tool depending from and secured to said projection, said tool comprising a plurality of prongs having their lower ends arranged obliquely with respect to said projection.

2. In a cultivator the combination of a carrier wheel, a frame supported thereon and provided with a laterally extending projection, and a cultivator tool depending from and secured to said projection, said tool comprising a plurality of prongs having their lower ends spaced apart in the direction of said projection and at successively decreasing distances from said projection in the direction of the outer end of the same.

3. In a cultivator the combination of a carrier wheel, a frame supported thereon and provided with a projection extending laterally on both sides of said wheel, and cultivator tools depending from and secured to said projection on each side of said wheel, said tools comprising a plurality of prongs having their lower ends arranged obliquely with respect to said projection.

4. In a cultivator the combination of a carrier wheel, a frame supported thereon and provided with a projection extending laterally on each side of said wheel, and cultivator tools depending from and secured to said projection on each side of said wheel, said tools comprising a plurality of prongs having their lower ends spaced apart in the direction of said projection and at successively decreasing distances from said projection in the direction of the outer ends of the same.

5. A cultivator tool comprising a head, means supporting said head, and a plurality of prongs depending from and secured to said supporting means, the lower ends of said prongs being arranged successively at greater distances from a plane transverse to the direction of travel of said tool.

6. A cultivator tool comprising a head, means supporting said head, and a plurality of curved prongs secured to and depending from said supporting means in parallel planes, the lower ends of said prongs being arranged successively at greater distances from a plane transverse to the direction of travel of said tool.

7. A cultivator tool comprising a head, means supporting said head, and a plurality of curved prongs secured to and depending from said supporting means, the lower ends of said prongs being spaced vertically from said supporting means successively at greater distances therefrom.

8. A cultivator tool comprising a head, means supporting said head, and a plurality of curved prongs secured to and depending from said supporting means, the lower ends of said prongs being spaced horizontally therefrom successively at greater distances.

9. A cultivator tool comprising a head, means supporting said head, and a plurality of curved prongs secured to and depending from said supporting means, the lower ends of said prongs being spaced both vertically and horizontally therefrom successively at greater distances.

10. In a cultivator, the combination with a frame, of a tool comprising a head and a plurality of prongs diverging therefrom, and terminating in teeth decreasing successively in width and in depth, the depths of the teeth increasing with their widths, below the ground plane of the cultivator.

11. In a cultivator, the combination with a frame, of a pair of tools spaced transversely of the frame, each tool having a head and a plurality of prongs diverging therefrom and terminating in teeth, and the teeth of each tool decreasing outwardly successively in width and in depth below the ground plane of the cultivator.

12. In a cultivator, the combination with a frame, of a pair of tools spaced transversely of the frame, each tool having a head and a plurality of prongs diverging therefrom and terminating in teeth, said tools being adjustably spaced transversely of the cultivator, and the teeth of each tool decreasing outwardly successively in width and in depth below the ground plane of the cultivator.

13. A cultivator tool comprising a head and a plurality of prongs diverging therefrom and terminating in teeth decreasing successively in width and in depth, the depths of the teeth increasing with their widths.

14. A cultivator tool having a head and a plurality of prongs extending therefrom and terminating in teeth, the teeth of each prong decreasing outwardly successively in width and in depth.

15. A cultivator tool provided with a head having means to prevent its rotation, and a plurality of prongs extending from said head and terminating in teeth extending in different distances from the ground plane, and in successively increasing distances from a plane transverse to the direction of travel of said tool.

In witness whereof, I have hereunto set my hand this twenty seventh day of October, A. D. 1908.

SAMUEL L. ALLEN.

Witnesses:
A. I. GARDNER,
ALEXANDER PARK.